Patented Oct. 31, 1944

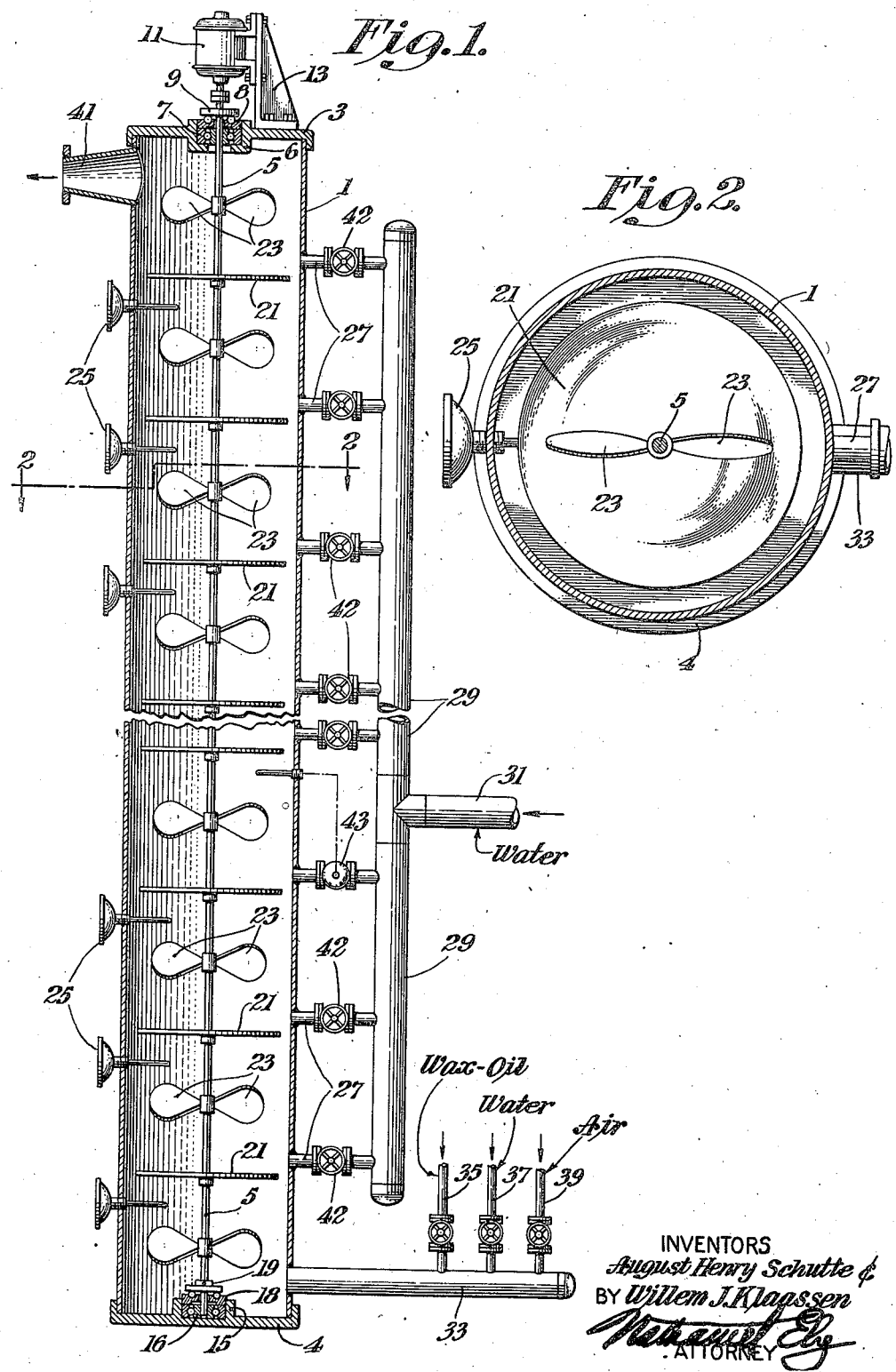

2,361,503

UNITED STATES PATENT OFFICE 2,361,503

WAX-OIL SEPARATION

August Henry Schutte, Hastings on Hudson, N. Y., and Willem J. Klaassen, Jersey City, N. J.

Application August 1, 1942, Serial No. 453,220

6 Claims. (Cl. 196—18)

This invention relates to the separation of wax-oil mixtures and more particularly to an improved method of and an apparatus for continuously agitating and cooling a dispersion of a wax-oil mixture and one or more fluids immiscible therewith to provide a slow controlled chilling of the dispersion. It is a modification of the invention described and claimed in the copending application of Klaassen, Serial No. 453,194, filed August 1, 1942.

In the process of separating wax from oil as disclosed in the prior patents of A. H. Schutte, Nos. 2,168,140, 2,168,141, 2,168,142, 2,168,143, and 2,168,306, issued August 1, 1939, a wax-oil mixture such as a slack wax or a wax-bearing oil, while in liquid condition, is agitated or emulsified with an immiscible fluid, and the resulting dispersion is cooled to solidify the portion of the wax desired to be separated. In the commercial operation of this process, it has been found that water and air, used together, are most satisfactory as the immiscible or non-solvent fluid and form a dispersion having the desired characteristics. The cooled, partially solidified dispersion is then passed to a centrifugal filter or the like, wherein the solidified wax is separated from the remaining liquid.

In the operation of the Schutte process as generally practiced heretofore, the wax-oil-water-air dispersion is conveniently formed by passing the wax-oil mixture, the water, and the air through a rotary pump or other suitable agitating or emulsifying device of a similar nature. The resulting mixture is circulated through the pump a sufficient number of times so that it has the desired dispersion characteristics. During such circulation, the dispersion is cooled to effect the desired solidification by the direct addition thereto of sufficient cooling water. This procedure results in shock chilling of the wax.

Although this procedure is generally satisfactory for the deoiling of crystalline wax-containing stocks having a relatively low oil content such as slack wax or the like, it has been found that a slow controlled chilling is more suitable for the treatment of other types of wax-oil mixtures. In particular, those mixtures which contain a relatively high percentage of oil (above approximately 30%) or which contain petrolatum or amorphous wax or which require a substantial amount of subcooling below the melting point are now amenable to a commercially satisfactory treatment by our invention. It appears necessary to subject such stocks to gradual cooling in order to obtain the desired wax-fraction in crystalline form so that the remaining oil and petrolatum, if any, may be effectively and sharply separated therefrom. Gradual cooling appears to facilitate the desired formation and growth of the wax crystalline structure.

The principal object of our invention is to provide a modified agitating and emulsifying apparatus in which the chilling or cooling of the wax-oil-water-air dispersion is effected in a gradual manner so that a controlled wax crystal growth is effected whereby an improved wax-oil separation may be accomplished as by centrifugal filtration or the like.

Another object of our invention is to provide an improved separation of a wax-oil mixture having a relatively high oil content or containing petrolatum or amorphous wax.

Further objects and advantages of our invention will be apparent from the following description thereof, taken in connection with the accompanying drawing, in which:

Fig. 1 is a vertical cross section through one form of embodiment of our modified apparatus;

Fig. 2 is a horizontal cross section taken substantially along the line 2—2 of Fig. 1.

Our modified apparatus comprises an agitating or emulsifying and cooling chamber 1, desirably cylindrical in form, which is provided with an upper cover plate 3 and a lower cover plate 4. This chamber is preferably vertically arranged as indicated for reasons which will appear hereinafter. Centrally positioned within chamber 1 is a vertical rotatable shaft 5 that passes through the depressed apertured section 6 in upper cover plate 3. This apertured section desirably contains ball bearing 7 and thrust bearing 8, through which shaft 5 also passes so that it can be freely rotated. Collar 9 attached to shaft 5 rests on thrust bearing 8 and aids in supporting shaft 5 within chamber 1. Shaft 5 is rotated by means of motor 11, which is conveniently secured to bracket 13, which in turn is desirably mounted on upper cover plate 3.

The lower end of this shaft 5 terminates in the boss 15, which is centrally located in lower cover plate 4. Ball bearing 16 and thrust bearing 18, through which shaft 5 passes, are contained in this boss. Collar 19 on shaft 5 rests on thrust bearing 18 and helps to support the shaft within chamber 1.

In accordance with our invention, a plurality of horizontal baffle plates 21 is suitably mounted along shaft 5 at spaced intervals. The effect of these baffles is to divide chamber 1 into a plurality of individual agitating and cooling compartments or zones. These baffles are desirably spaced at equal distances from each other but need not necessarily be so positioned. The diameter of the baffles is somewhat less than that of chamber 1 as indicated for a purpose to be more fully set forth hereinafter. Also mounted on shaft 5 is a plurality of agitating blades or paddles 23, at least one pair of which is positioned within each of the compartments defined by baffle plates 21. Each pair of agitating blades is desirably positioned substantially centrally in its respective compartment. Each compartment is also provided with a suitable temperature indicating device such as a thermometer 25, which is preferably positioned in the upper portion of the compartment above the agitating blades therein.

Chamber 1 is also provided with a plurality of valved inlet pipes 27, through which a suitable cooling medium can be directly introduced thereinto. Preferably, each compartment is provided with one inlet, and each inlet discharges into the lower portion of its respective compartment desirably substantially immediately above the lower baffle plate and below the pair of agitating blades. These inlet pipes are connected to a manifold 29, into which the desired cooling medium is introduced through pipe 31. It is to be noted that the lowermost compartment is desirably not provided with a cooling medium inlet pipe.

This lowermost compartment, however, is provided with the feed inlet manifold 33, which also desirably discharges into the lower portion of this compartment below its pair of agitating blades. Attached to this feed manifold is a plurality of individual valved feeding pipes 35, 37, and 39, through which the particular ingredients of the dispersion are introduced. The uppermost compartment of chamber 1 is provided with the discharge nozzle 41, through which the resulting chilled dispersion is passed to a centrifugal separator or the like for the desired separation.

In the operation of our modified apparatus in the preparation of a wax-oil mixture for continuous separation, the wax-oil mixture together with air and water may be conveniently introduced through manifold 33 into the agitating and cooling chamber 1. The wax-oil mixture is introduced through line 35, and the non-solvent, non-reactive liquid such as water and the inert, non-solvent gas such as air may be introduced through lines 37 and 39, respectively. The three materials mix with each other in manifold 33, and the resulting mixture is then introduced into the lowermost compartment of chamber 1. The wax-oil mixture is desirably in a molten condition, and the temperature of the water and the air is at least as high as that of the wax-oil mixture to avoid premature chilling thereof so that the deleterious effects of shock chilling can be avoided. Preferably, the mixture is not agitated or emulsified before it is introduced into this compartment; but, if desired, it may be so agitated or emulsified, in which case a suitable agitating or mixing device such as a rotary pump (not shown) may be installed in manifold 33 after pipe 35.

Within the lowermost compartment the mixture of materials is subjected to an initial agitation or emulsification by means of the respective pair of agitating blades 23, which are rotated at a high rate of speed desirably in the neighborhood of 1000 R. P. M. The mixture of materials is continuously fed to the lowermost compartment, and the partially agitated and admixed materials already therein are thus continuously forced upwardly by displacement through the annular space between the lowermost baffle 21 and the chamber wall into the next upper compartment. Conditions in this lowermost compartment are preferably so maintained that no substantial drop in temperature occurs therein; hence, no cooling medium is introduced thereinto. This procedure has been found desirable to avoid shock chilling and also prevents undesirable premature cooling of the incoming mixture of materials.

Within this next upper compartment the partially agitated admixture is subjected to further agitation and emulsification by means of the pair of agitating blades positioned therein. At the same time it is admixed with a controlled amount of cooling medium introduced through the respective inlet pipe 27. The temperature of the cooling medium is, of course, lower than that of the dispersion entering this compartment. This cooling medium is preferably the same as the non-solvent liquid, in this case water, used to form the initial dispersion but may be any suitable nonsolvent fluid. The amount of water introduced is regulated in accordance with the temperature of the dispersion leaving this compartment. The effect of the added water is to lower the temperature of the dispersion in this compartment, but the quantity of water added is so controlled that only a slight amount of cooling is accomplished. Sudden or shock chilling of the dispersion is thereby avoided. According to the nature of the stock undergoing separation and the conditions of agitation and cooling, a partial solidification of the wax may or may not take place in this compartment.

As in the case of the lowermost compartment, the slightly chilled dispersion in this next upper compartment is forced by displacement upwardly around the next upper baffle 21 through the several compartments of chamber 1. In each compartment the same procedure is repeated: the dispersion is subjected to further agitation by the pairs of agitating blades 23; regulated amounts of water are introduced through inlet pipes 27 for gradual cooling of the dispersion; and the dispersion is continuously forced upwardly by displacement. The final dispersion is discharged from the uppermost compartment through nozzle 41 to a centrifugal separator (not shown) or the like for separation of the solidified wax therefrom. Nozzle 41 preferably has a larger cross section than the feed manifold 33 so that no plugging of the discharge outlet can take place.

In accordance with our invention, the chilling of the dispersion in its upward passage through chamber 1 is entirely gradual in nature. Desirably, the chilling is most gradual in the several lowermost chambers especially when a slack wax or the like is being deoiled; i. e., the lowest temperature gradation is maintained in the region of initial chilling or freezing. Preferably, the rate of chilling is such that a temperature drop of approximately 1 to 2° F. per compartment is effected in the case of deoiling and a temperature drop of several degrees but desirably not materially over 5° F. per compartment is effected in the case of dewaxing. At no time does any sudden or shock chilling of the dispersion take place. The overall cooling, of course, is sufficient to solidify the particular wax fraction desired to be separated.

Such gradual cooling rates, as compared to shock chilling wherein the wax-oil dispersion is suddenly subjected to a cooling action, permit and facilitate the proper formation and growth of the wax crystals which make up the ultimate solid wax mixture. Interference with this crystalline formation and growth by any oil and/or petrolatum that is present is substantially eliminated by the controlled gradual cooling action which provides sufficient time for the wax crystals to form and to grow into the desired structure. The result is that a greatly improved solidified wax structure is obtained; and, consequently, better separation of the wax from the oil is accomplished.

In this connection the baffles are of particular advantage in that they provide a plurality of zones containing partially chilled dispersion, which zones are substantially entirely independent of each other. As a result, there is no intermingling of the dispersion in one zone with that in another; and the materials in any particular zone are intimately contacted and agitated and are cooled to the desired degree without interference from or with the identical procedure simultaneously taking place in adjacent zones. Consequently, a fully controlled cooling of the dispersion is made possible.

Generally, it is desirable to effect the agitation under a superatmospheric pressure and to discharge the resulting dispersion at atmospheric pressure. The higher the pressure in chamber 1, the more air will be incorporated in the dispersion, and the more porous the resulting wax structure will be. The agitation may also take place at atmospheric pressure if desired. Where pressure operation is employed, a suitable stuffing box (not shown) must be provided for shaft 5 to prevent the loss of pressure from chamber 1.

The amount of water introduced into each compartment is controlled by the temperature of the partially chilled dispersion continuously discharged therefrom and is also governed by the amount of cooling to be accomplished therein. As shown in the drawing, this regulation may be accomplished by manual variation of the setting of the valves 42 in the several cooling water inlet pipes 27. Alternatively, automatically operated valves as at 43 controlled by the temperature in each compartment may be utilized for this purpose. As previously noted, preferably no cooling water is introduced into the lowermost compartment, the contents of which are desirably maintained in a liquid condition. With this type of cooling, however, only sufficient water is introduced through line 37 to insure the initial formation of the dispersion in the lowermost compartment since the necessary cooling water is subsequently added to the dispersion in stages. It will be appreciated that the temperature of the cooling water introduced through line 31 is at least as low as the temperature of the final chilled dispersion. If desired, however, several manifolds such as 29 may be employed to introduce cooling water of different temperatures into the respective compartments of chamber 1 with the highest temperature water being introduced into the lowest compartments. It will be also appreciated that the apparatus is suitably insulated so that the desired cooling conditions can be maintained.

The rate of cooling and the time of residence of the wax-oil dispersion in chamber 1 depends principally on the particular stock being treated. A residence time of ½ hour or more of the wax-oil dispersion in chamber 1 is ordinarily satisfactory. The precise lower limit of time is not known; but, from our experimental results, it appears that, at the least, several minutes' residence time is necessary to effect the desired gradual cooling and to obtain a successful separation. The rate of cooling is readily adjusted by varying the throughput and the amount of cooling medium and any desired time temperature curve is possible.

In one particular embodiment of our invention, chamber 1 was constructed with twelve individual agitating and cooling compartments. The baffles in this case were so designed that there was a clearance of about ⅜ inch between the baffles and the wall of the chamber, which was 4 inches in diameter. The spacing between each pair of baffles was about 10 inches.

Our modified apparatus may be used in the separation of substantially any type of wax-oil mixture containing crystalline wax and may also be used in the separation of a mixture of crystalline waxes into desired wax fractions. It may be desirably applied to the deoiling of a slack wax with improved operation; but it is particularly applicable to the processing of paraffin distillates, petrolatum-containing stocks, and other high oil content stocks. It is to be particularly emphasized that our invention can effectively treat stocks containing petrolatum, the presence of ½% or more of which seriously interferes with the crystallization of the wax on shock chilling thereof, and that our invention can also effectively treat stocks containing relatively large amounts of oil, the presence of about 30% or more of which prevents the obtaining of the desired results on shock chilling of the stock.

The following operations are typical of the application of our invention. A petrolatum-containing slack wax having a melting point of 110° F. is melted and admixed with water and air, and the resulting mixture is introduced into the lowermost compartment at a temperature of about 115° F. In passing upwardly through the cooling chamber, the mixture is agitated, and its temperature is gradually reduced. During the initial stages of cooling, a 1-2° F. temperature drop per compartment is maintained preferably from the melting point to about 5° F. below the melting point. The cooling may then be somewhat more rapid up to the discharge temperature, which in this case may desirably be about 95° F.

Although a vertical arrangement of our agitating and cooling apparatus is preferable, such apparatus may also be satisfactorily arranged in other positions such as horizontal. When the apparatus is horizontally arranged, however, it is desirable to position inlet manifold 33 so that it feeds into the lower side of the chamber and nozzle 41 so that it discharges from the upper side of the chamber. In such case it is also desirable to arrange the water manifold 29 along the lower side of the chamber.

Although water constitutes a suitable non-solvent liquid for this separation, in some cases it may be desirable to use a different non-solvent liquid such as a suitable brine solution or an alcohol such as methyl alcohol or ethyl alcohol or the like. Other inert, non-solvent gases such as carbon dioxide or nitrogen may be used in place of air if it is desirable for any reason to do so. It will be appreciated, however, that water and air are most desirable from an economic point because of their cheapness and ready availability.

It will be appreciated that the application of our invention is not necessarily limited to the separation of a wax-oil mixture. It may also be advantageously applied to the separation of other types of mixtures which are amenable to separation by the Schutte process. In this connection, attention is called to the prior copending applications of Schutte, Serial Number 274,412, filed May 18, 1939; Serial Number 411,646, filed September 20, 1941; Serial Number 411,647, filed September 20, 1941; and Serial Number 411,648, filed September 20, 1941, now Patents Nos. 2,296,456, 2,296,457, 2,296,458, and 2,296,459, respectively, all dated September 22, 1942, wherein the Schutte process is applied to the separation of a mixture of at least two organic compounds or a solution of an organic compound in an inorganic liquid such as water, which compounds have different melting points and at least one of which is crystalline. Furthermore, our modified apparatus is applicable to the preparation of other types of dispersions or similarly agitated or emulsified mixtures.

Although we have described a preferred form of embodiment of our invention, we are aware that modifications may be made thereto; therefore, only such limitations as appear in the claims appended hereinafter should be applied.

We claim:

1. An apparatus for the combined agitating and cooling of a wax-oil dispersion, which comprises an elongated vertical chamber having closed upper and lower ends, means to introduce in liquid condition a mixture of a wax-oil mixture, a non-solvent, non-reactive liquid, and an inert, non-solvent gas into the lower end of the chamber, horizontal baffle plates mounted within said chamber to divide it into a vertical series of compartments defined by the chamber wall and the baffle plates, said baffle plates having an area slightly less than that of the horizontal cross section of the chamber to afford restricted communications between said compartments for continuous flow of such mixture from compartment to compartment, agitating devices mounted within each compartment, means for rotating said devices simultaneously to agitate said mixture in the compartments, means to introduce a non-solvent, non-reactive cooling medium in controlled amounts directly into the dispersion in each compartment at a point immediately above the lower one of said communications to said compartment for impulsion of the cooling medium by the mixture flowing upwardly through said restricted communication to circulate the cooling medium through the mixture for gradual cooling of the resulting dispersion, and means to pass the cooled dispersion from the upper end of the chamber.

2. An apparatus for the combined agitating and cooling of a wax-oil dispersion, which comprises a vertical cylindrical chamber having closed upper and lower ends, means to introduce in liquid condition a mixture of a wax-oil mixture, a non-solvent, non-reactive liquid, and an inert, non-solvent gas into the lower end of the chamber, circular horizontal baffle plates within said chamber to divide it into a plurality of compartments defined by the chamber wall and adjacent baffle plates, said baffle plates having a diameter slightly less than that of the chamber to permit continuous flow of such mixture through the annular space between said plates and said chamber, agitating blades substantially centrally positioned within each compartment to agitate such mixture, a vertical central shaft within such chamber, said baffle plates and said agitating blades being attached thereto, means to rotate such shaft at a relatively high rate of speed, means to introduce a non-solvent, non-reactive cooling medium in controlled amounts directly into the dispersion as it enters each compartment immediately above the baffle defining the lower extent of such compartment to effect a gradual cooling of the resulting dispersion, means positioned in the upper portion of each compartment immediately below the baffle defining the upper extent thereof to measure the temperature of the wax-oil dispersion therein, means to regulate the amount of non-solvent cooling medium introduced into each compartment in accordance with the temperature therein, and means to remove the cooled dispersion from the upper end of the chamber.

3. The method of slowly cooling a crystalline wax-containing wax-oil mixture to form a wax aerogel for the separation of the oil from the wax, which comprises admixing such mixture, while in liquid condition, with water and air, continuously introducing such admixture into the lower end of an agitating and cooling chamber composed of a plurality of individual agitating and cooling zones, causing such admixture to flow continuously through said zones in series by displacement by the continuous introduction thereof, restricting the passage of the admixture from zone to zone, simultaneously violently agitating the admixture mechanically in said zones, gradually chilling the resulting dispersion during agitation thereof in and passage thereof through each zone by injecting relatively cold water directly into the dispersion as it enters the lower portion of each zone to crystallize the wax and to incorporate the maximum amount of air with the wax crystals for the formation of a wax aerogel, carrying out the agitation and the cooling in each zone substantially independently of the similar operations being simultaneously performed in the other zones, controlling the amount and temperature of the water directly injected into the dispersion in each zone in accordance with the temperature of the dispersion as it leaves the upper portion of each zone to control the formation of the wax aerogel, and withdrawing a cooled, partially solidified dispersion from the upper end of said chamber.

4. The method as claimed in claim 3, which includes maintaining the admixture in the first zone substantially at its introduction temperature to avoid premature and shock chilling thereof.

5. The method as claimed in claim 3, wherein the crystalline wax-containing wax-oil mixture comprises a slack wax containing over about ½% of petrolatum and which includes maintaining a temperature gradation through said zones of approximately 1 to 2° F. per zone.

6. The method as claimed in claim 3, in which the crystalline wax-containing wax-oil mixture comprises a wax-containing oil, the oil content of which amounts to more than about 30%, and which includes maintaining a temperature gradation through said zones of about 5° F. per zone.

AUGUST HENRY SCHUTTE.
WILLEM J. KLAASSEN.